Aug. 19, 1952     C. J. PAVLIK     2,607,386

ANTISKID TIRE TREAD

Filed Jan. 3, 1949

Inventor
CHARLES J. PAVLIK

By Martin E. Anderson

Attorney

Patented Aug. 19, 1952

2,607,386

UNITED STATES PATENT OFFICE 2,607,386

ANTISKID TIRE TREAD

Charles J. Pavlik, Denver, Colo., assignor to The Gates Rubber Company, Denver, Colo., a corporation of Colorado Application January 3, 1949, Serial No. 68,827

6 Claims. (Cl. 152—211)

This invention relates to pneumatic tires and more particularly to improvements in antiskid treads for same.

It has heretofore been proposed to incorporate certain inclusions in the tread material of tires intended to improve the antiskid characteristics on road surfaces coated with ice, snow, water, or other material which renders the road surface slippery. One such construction involves the use of salt crystals imbedded in the tread which dissolve therefrom in the presence of water, leaving minute cavities which act, probably as suction cups, to aid in reducing skidding. In another construction, particles of wood, such as sawdust, are employed which provide a multiplicity of surfaces projecting beyond the tread which are intended to grip the road surface.

It has been discovered that far superior resistance to skidding, over the constructions mentioned, may be achieved by interspersing within the tread, ground corn cob particles of a certain size and in certain proportions, as will hereinafter be set forth.

It is not known definitely why the superior results are achieved, but there is a possibility that the particles produce a tire surface which has characteristics similar to both the salt and sawdust constructions. These particles are substantially impervious to absorption of water which aids in permitting them to slip out of the tread leaving minute cavities therein. This material is unlike sawdust since moisture tends to swell the latter and wedge it in the tread more tightly. The particles, hereinafter referred to as cobmeal, also remain relatively hard despite wetting, and prior to dislodgment probably cut into the road covering, such as ice, producing minute cavities therein, thus aiding in the gripping of the tire. In this respect they differ from salt wherein projecting crystals would probably dissolve or wear down and produce no substantial "biting" into the road covering. They also differ from a salt in that they have rounded corners rather than sharp corners, which is characteristic of any crystalline formation. These rounded corners leave cavities in the tread, after the cobmeal particles fall out, which are more rounded in contradistinction to the sharp cornered cavities left by salt crystals. It is believed that these rounded cavities also probably reduce stress concentrations, about the cavities because of the rounded nature thereof. It has been observed that a tire tread constructed with interspersed cobmeal has a longer life than with particles heretofore used and it is quite possible that the reduction of stress concentrations, and hence a reduction of elastic fatigue, may be responsible for this in whole or in part. Regardless of the actual reasons for the improved traction of a tire constructed in accordance with this invention, and its improved resistance against wear, exhaustive tests have definitely established that it has such improved characteristics.

The principal objects of the invention, therefore, are to provide a tire tread which is highly resistant to skidding, has improved wearing characteristics, and which uses an interspersed material in its mass which is readily available and inexpensive in cost.

Further objects, advantages and salient features will become more apparent from a consideration of the description to follow, the appended claims, and the accompanying drawing in which:

Figure 1:
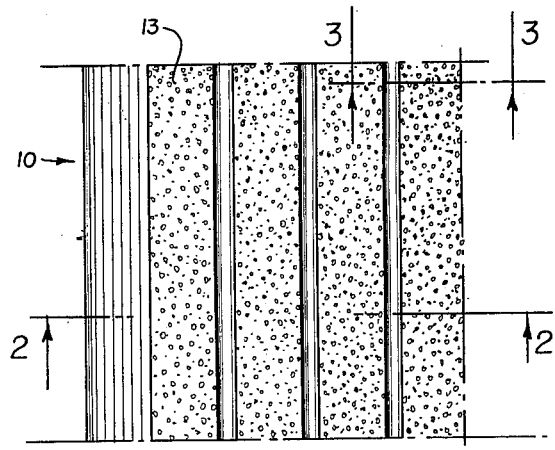
Figure 1 is a plan view of a tire showing a tread which incorporates interspersed cobmeal in its mass.

Referring in detail to the drawing, for the purpose of illustration, a pneumatic tire 10 has been shown, having a conventional cord casing 11 with a rubber tread 12 thereon which has been worn nearly to the casing and suitably prepared to receive a retread 13 of the tread material which forms the subject of the invention. It is to be understood, of course, that the tread material is equally applicable to new tires where the material would be applied to the casing during original manufacture.

Figure 4:
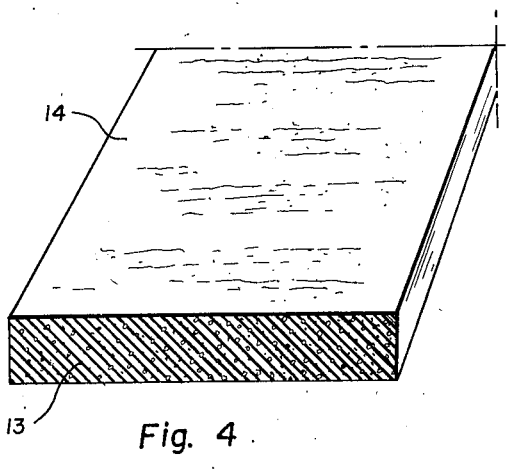
Figure 4 is a fragmentary perspective, partly in section, of a strip of camelback prior to its application to a tire casing.

In Figure 4 is shown a cross section of the tread material 14 before application to the tire casing, this material being in the unvulcanized state and commonly known as camelback. It is applied to a tire casing and vulcanized in any manner well known in the art.

The cobmeal particles which are interspersed in the tread material are formed from dried corn cobs which have been ground to a size to pass through a 10 mesh screen but not through a 20 mesh, that is they are of a size between the limits of 10 and 20 mesh. The grinding of these particles imparts to the surfaces thereof a hard polished finish which renders them less pervious to absorption of water and also reduces the coefficient of friction so that they become easily dislodged from the cavities which retain them in the tire.

These particles are mixed with the tread material in any manner well known in the art, such as by a Banbury mixer. The tread material is formed into strips, as by extrusion, also as well understood in the art. About 20% by weight of particles to the total mass of the tread material has been found to give excellent results although as little as 15% and as much as 35% has also given satisfactory results. The other principal component of the tread material is rubber, which may be either natural rubber, synthetic rubber, or combinations of the two in various proportions. Since it is common in the art to provide treads of either of these materials, or combinations thereof, depending upon desired tread characteristics, further details regarding the rubber component is deemed unnecessary.

Figure 3:
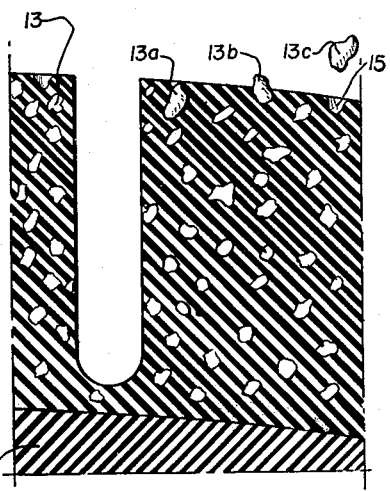
Figure 3 is an enlarged section taken on line 3—3, of Figure 2.
Figure 2:
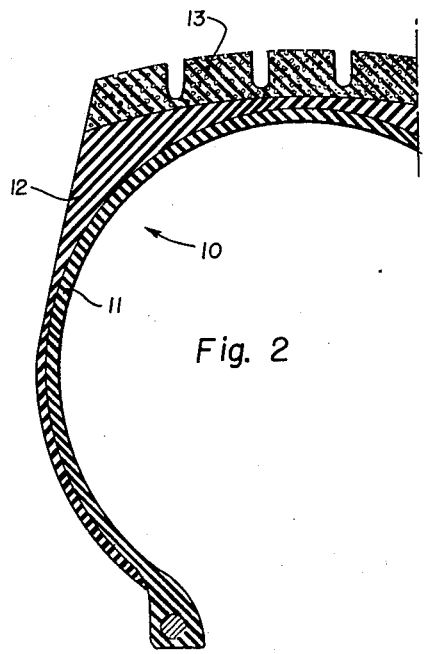
Figure 2 is a section taken on line 2—2, Figure 1.

Referring to Figure 3 a greatly enlarged section of the tread material has been shown to illustrate the nature thereof at one stage of wear. Particle 13a of the cobmeal is completely embedded in the tread and has no effect upon the surface characteristics thereof. Particle 13b is partially embedded within the tread but has a portion which extends slightly beyond the surface. As previously explained, particles such as this would "bite" into the road surface and aid in reducing skidding. Particle 13c is shown as it is being dislodged from the tread leaving cavity 15. Cavities 15 also aid in preventing skidding, either by their suction cup effect, by reason of the surface of the roadway engaging with such cavities due to the pressure of the tire thereon, or both. As the tire wears particle 13b will be dislodged forming a cavity 15 and particle 13a will be slightly exposed, appearing somewhat like particle 13b in the figure. Thus, at all stages of wear, there will be a large number of cavities 15 and projecting particles such as 13b. Whether the projecting particles or the cavities produce the major effect in reducing skidding is not definitely known due to the difficulty of measuring the relative effects under actual operating condtions. However, it is believed that the cavities produce the major contributing effect at least under certain conditions, as for example, on a wet hard and smooth surface where conditions. However, it is believed that the projections could not readily bite into such surface. On an icy surface, however, the cavities would still perform as just explained, but the projecting particles would have a greater tendency to contribute to the antiskid characteristics because of their biting effect into such a surface. It seems logical, therefore, that the projecting particles and cavities would contribute varying antiskid effects depending upon the nature and condition of the roadway.

Also, it is to be observed that the cavities 15 have curved surfaces without sharp corners. Cavities of such shape are believed to have a much greater effect in reducing skidding than cavities formed by a soluble crystalline chemical which would necesarily have sharp corners.

The hard polished surfaces of the cobmeal particles are also important and are to be distinguished from materials such as sawdust or wood particles. The latter, when wet, swell in the surrounding tread material and become more tightly lodged therein preventing the formation of open cavities. The material of this invention, on the other hand, is relatively impervious to absorption of water and when a particle becomes sufficiently exposed, the hard polished surface thereof permits it to slide easily from the tread material, thus producing cavities.

While cobmeal of a size within certain limits and a proportion of the cobmeal to the tread material also within certain limits has been disclosed, these limits are those which have been found to give the most satisfactory results and the invention is not to be limited thereto, except as defined within the scope of the appended claims. The term "rubber," as used in the claims, is also to be given its broadest and more common meaning and to include synthetic substitutes as well as natural rubber. The term is further defined as a material which is resilient, vulcanizable, and having physical and chemical characteristics similar to the material employed in automobile tires and other rubber articles having like characteristics. It is to be distinguished from any material which is tacky, sticky, flowable as a liquid, or semiliquid, when in its finished vulcanized state.

Having described the invention what is claimed as new is:

1. A tire tread comprising a cured rubber matrix and solid, hard ground, polished and substantially moisture impervious corncob particles having irregular shapes with rounded edges and corners uniformly interspersed therethrough, some of the particles normally protruding from the surface of the tread, and the polished surfaces and rounded edges and corners acting to release some of the particles from time to time as the tread is worn leaving rounded cavities in the surface of the tread.

2. A tire tread comprising a cured rubber matrix and solid, hard ground, polished and substantially moisture impervious corncob particles having irregular shapes with rounded edges and corners uniformly interspersed therethrough, said particles being of a size which passes through a 10 mesh screen but is retained by a 20 mesh screen, some of the particles normally protruding from the surface of the tread, and the polished surfaces and rounded edges and corners acting to release some of the particles from time to time as the tread is worn leaving rounded cavities in the surface of the tread.

3. A tire tread comprising a cured rubber matrix and solid, hard ground, polished and substantially moisture impervious corncob particles having irregular shapes with rounded edges and corners uniformly interspersed therethrough, said particles being in the proportion of from about 15 per cent to about 35 per cent by weight of the total mass of the tread, some of the particles normally protruding from the surface of the tread, and the polished surfaces and rounded edges and corners acting to release some of the particles from time to time as the tread is worn leaving rounded cavities in the surface of the tread.

4. A strip of camelback adapted for use in tire retreading comprising a matrix of vulcanizable rubber and solid, hard ground, polished and substantially moisture impervious corncob particles having irregular shapes with rounded edges and corners uniformly interspersed therethrough, some of the particles normally protruding from the surface of the matrix, whereby, when the camelback has been applied to a tire the polished surfaces and rounded edges and corners of said particles will act to release some of the particles from time to time as the outer surface of the camelback is worn leaving rounded cavities in the surface thereof.

5. A strip of camelback adapted for use in tire retreading comprising a matrix of vulcanizable rubber and solid, hard ground, polished and substantially moisture impervious corncob particles having irregular shapes with rounded edges and corners, said particles being of a size which passes through a 10 mesh screen but is retained by a 20 mesh screen, some of the particles normally protruding from the surface of the matrix, whereby when the camelback has been applied to a tire the polished surfaces and rounded edges and corners of said particles will act to release some of the particles from time to time as the outer surface of the camelback is worn leaving rounded cavities in the surface thereof.

6. A strip of camelback adapted for use in tire retreading comprising a matrix of vulcanizable rubber and solid, hard ground, polished and substantially moisture impervious corncob particles having irregular shapes with rounded edges and corners, said particles being in the proportion of from about 15 per cent to about 35 per cent by weight of the total mass of the matrix, some of the particles normally protruding from the surface of the matrix, whereby, when the camelback has been applied to a tire the polished surfaces and rounded edges and corners of said particles will act to release some of the particles from time to time as the outer surface of the camelback is worn leaving rounded cavities in the surface thereof.

CHARLES J. PAVLIK.

REFERENCES CITED

The following references are of record in the file of this patent:

UNITED STATES PATENTS

| Number | Name | Date |
|---|---|---|
| Re. 23,135 | Gapen et al. | July 19, 1949 |
| 717,944 | Thame | Jan. 6, 1903 |
| 2,031,960 | Kempel | Feb. 25, 1936 |
| 2,103,648 | Snelling | Dec. 28, 1937 |
| 2,171,438 | Tarbox | Aug. 29, 1939 |
| 2,433,849 | Lathrop et al. | Jan. 6, 1948 |

FOREIGN PATENTS

| Number | Country | Date |
|---|---|---|
| 703,087 | France | Apr. 23, 1931 |